H. L. HEATON.
Churn-Dasher.
No. 203,730.        Patented May 14, 1878.
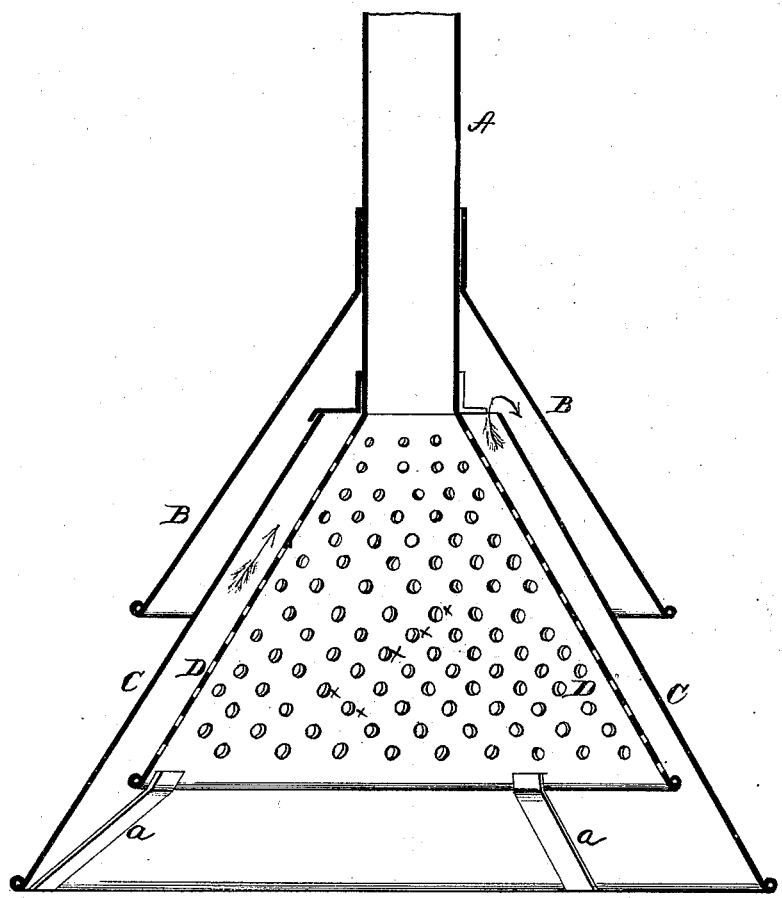

UNITED STATES PATENT OFFICE.

HORACE L. HEATON, OF WEST JEFFERSON, OHIO.

IMPROVEMENT IN CHURN-DASHERS.

Specification forming part of Letters Patent No. 203,730, dated May 14, 1878; application filed March 27, 1878.

*To all whom it may concern:*

Be it known that I, H. L. HEATON, of West Jefferson, in the county of Madison, and in the State of Ohio, have invented certain new and useful Improvements in Churn-Dashers; and do hereby declare that the following is a full, clear, and exact description thereof, reference being had to the accompanying drawings, and to the letters of reference marked thereon, making a part of this specification.

The nature of my invention consists in the construction of a churn-dasher in the manner hereinafter particularly described.

To enable others skilled in the art to make and use my invention, I will proceed to describe its construction and operation.

In the accompanying drawing, making part of this specification, and in which a vertical section is represented, A represents a metallic tube, to which the handle as well as the other parts of the dasher are connected. B, C, and D represent three concentric sections of cones, which are secured to the tube A, and which are sufficiently distant from each other to allow of a free escape of air and cream. The inner cone D is provided with numerous perforations, through which liquid escapes, passing between it and cone C down into the churn-body. The upper end of cone C opens into the outer cone B, as seen, and allows of the escape of air between the two. By this arrangement sufficient air is allowed to escape, so that the efficiency of the dasher will be promoted, and then, the inner cone being perforated, air and cream can pass through with force without splashing the cream or milk upon the operator.

This device, as constructed, might be used as a clothes-pounder, if desired.

Having thus fully described my invention, what I claim as new, and desire to secure by Letters Patent, is—

The combination of the imperforate bottom or main cone C, the perforated cone D, of smaller size, secured within the cone C by the straps *a*, leaving an air-chamber between and having an air-passage at the top, and the upper imperforate cone B overlapping the top of cone C, and forming an air-chamber between the two cones B and C, all connected to the tube A, as and for the purposes set forth.

In testimony that I claim the foregoing I have hereunto set my hand this 21st day of February, 1878.

HORACE L. HEATON.

Witnesses:
 WM. E. BOOTH,
 GEO. W. OAKLEY.